J. J. STONE & J. A. SIMPSON.
RESILIENT WHEEL.
APPLICATION FILED MAR. 19, 1910.
972,283.
Patented Oct. 11, 1910.
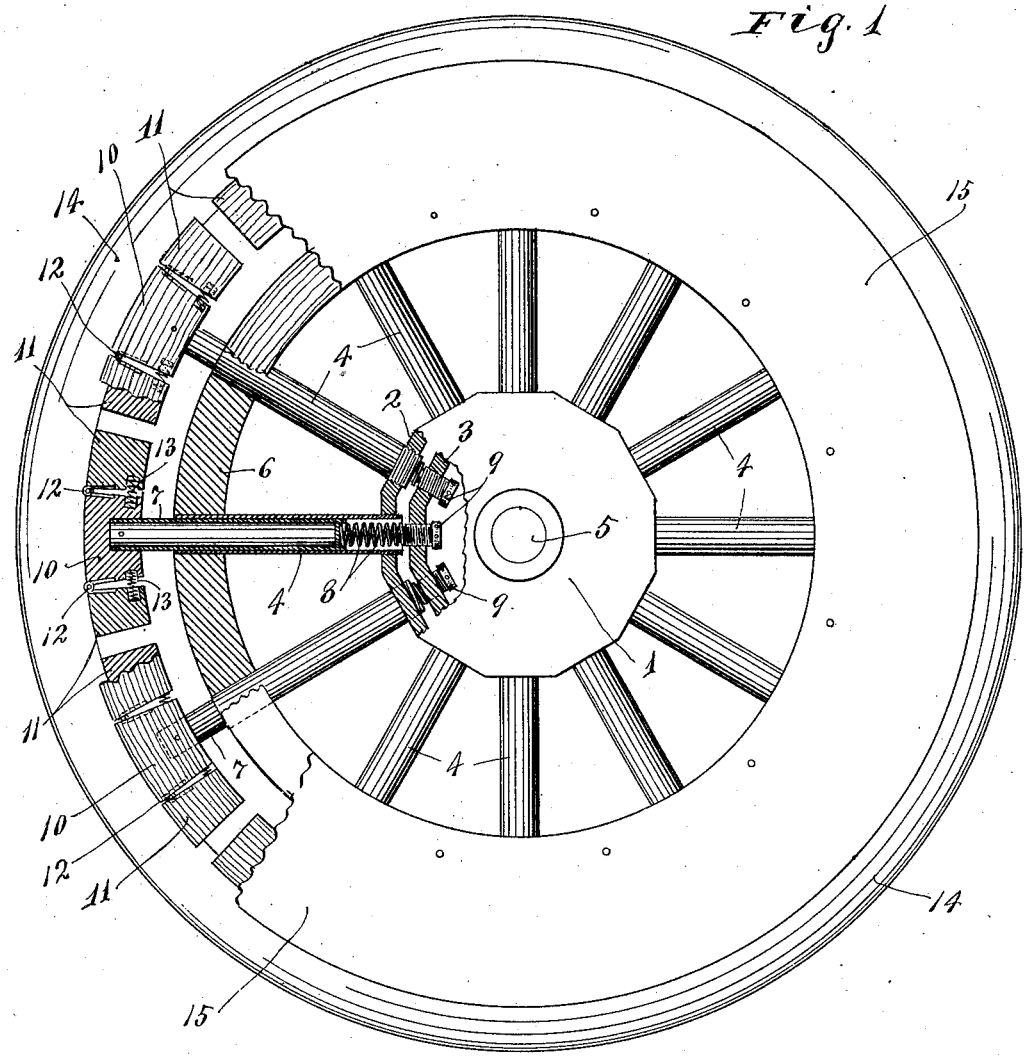
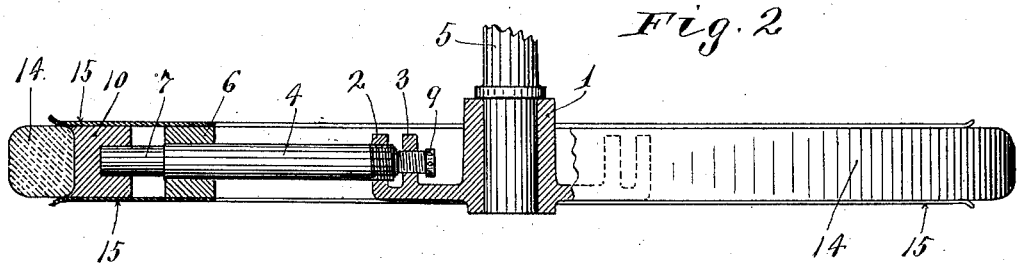
Witnesses.
A. H. Opsahl.
W. H. Souba
Inventors.
John J. Stone
John A. Simpson
By his Attorneys
Williamson & Merchant

UNITED STATES PATENT OFFICE.

JOHN J. STONE AND JOHN A. SIMPSON, OF BERESFORD, SOUTH DAKOTA.

RESILIENT WHEEL.

972,283.

Specification of Letters Patent.   Patented Oct. 11, 1910.

Application filed March 19, 1910.   Serial No. 550,307.

*To all whom it may concern:*

Be it known that we, JOHN J. STONE and JOHN A. SIMPSON, citizens of the United States, residing at Beresford, in the county of Union and State of South Dakota, have invented certain new and useful Improvements in Resilient Wheels; and we do hereby declare the following to be a full, clear, and exact description of the invention, such as will enable others skilled in the art to which it appertains to make and use the same.

Our invention has for its object to provide an improved resilient wheel especially adapted for use on automobiles and which will make possible the use of solid tires instead of the customary pneumatic tires.

To the above ends the invention consists of the novel devices and combinations of devices hereinafter described and defined in the claims.

In the accompanying drawings which illustrate the improved wheel, like characters indicate like parts throughout the several views.

Referring to the drawings, Figure 1 is a view in side elevation, some parts being in section and some parts being broken away. Fig. 2 is a view partly in plan and partly in horizontal section.

The wheel hub 1 is provided with concentric laterally projecting flanges 2 and 3, to the former of which outwardly extended tubular spokes 4 are rigidly secured at their inner ends by threaded engagement or otherwise. As shown, hub 1 is mounted on an end of axle 5. At their outer ends the tubular spokes 4 are rigidly seated in and extend through an inner wheel rim 6 preferably constructed of wood. Supplemental spokes 7 which as shown are also tubular, work telescopically within the tubular spokes 4 and at their inner ends are engaged and yieldingly pressed outward by coiled springs 8 seated at their inner ends against short bolts or screws 9, which latter work with threaded engagement through the inner hub flange 3. To the outer end of each supplemental spoke 7 is rigidly secured a segmental tread block or head 10. Each tread block 10 is provided with two supplemental sections 11 secured thereto by hinges 12 and the blocks are yieldingly pressed apart by coiled springs 13 seated therein. These tread blocks 10 and their supplemental sections 11 are by the springs 8 yieldingly pressed against a flexible tire 14 perfectly constructed of rubber in solid or approximately solid form. Between the adjacent supplemental block sections 11 there is sufficient clearance to permit maximum inward movements of the said blocks. The inward movements of blocks 10 and 11 are limited by the inner wheel rim 6 against which they are thrown when subjected to extreme pressure or intense shocks. Each spring pressed or spring extended spoke gives resilience to a different portion of the tire 14 and the flexibility of the tire is increased by the spring pressed supplemental blocks 11.

By adjustment of the screws 9 the weight carrying capacity of the wheel may be very materially changed to adapt the wheel to different automobiles and to different loads.

The so-called tread blocks 10 and 11 and the inner portion of the tire 14, work between and in close engagement with a pair of laterally spaced annular retaining plates 15, preferably constructed of sheet metal and bolted, riveted or otherwise rigidly secured to the inner wheel rim 6. One or both of the said retaining plates 15 should be detachable to afford access to the tread blocks and to permit of the application and removal of the tire 14. Preferably the tread blocks 10 and 11 are grooved on their outer faces so as to receive and better hold the tire 14.

The resilient wheel of the character above described is intended to make unnecessary the use of pneumatic tires and to provide a tire that is unaffected or cannot be disabled by punctures, and which at the same time will have the required resilience.

What we claim is:—

1. A resilient wheel having yieldingly pressed telescopically extensible spokes provided at their outer ends with tread blocks, having hinged supplemental sections secured to their outer edges, and springs interposed between said tread blocks and said supplemental sections, and a flexible tire surrounding and engaging said tread blocks.

2. A resilient wheel having yieldingly pressed telescopically extensible spokes provided at their outer ends with tread blocks, said tread blocks having hinged supplemental sections which are yieldingly pressed laterally with respect thereto and the supplemental sections of adjacent tread blocks being disconnected and normally separated, substantially as described.

3. A resilient wheel comprising a hub member, and an inner wheel rim, tubular spokes rigidly connecting said rim and hub, supplemental spokes working telescopically in said tubular spokes, and spring pressed outward, tread blocks secured to the outer ends of said supplemental spokes and provided with hinged supplemental sections which are yieldingly pressed laterally with respect thereto and the supplemental sections of adjacent tread blocks being disconnected and normally separated, a flexible tire engaging and surrounding said tread blocks, and a pair of annular retaining plates secured to said inner wheel rim and embracing said tread blocks and a portion of said tire, substantially as described.

In testimony whereof we affix our signatures in presence of two witnesses.

JOHN J. STONE.
JOHN A. SIMPSON.

Witnesses:
H. J. MEIDELL,
H. MEIDELL.